United States Patent [19]
Van Manen

[11] 3,752,625
[45] Aug. 14, 1973

[54] ROTARY PARAXIAL-CAVITY RECIPROCABLE-CORE INJECTION MOLD/INJECTION BLOW MOLD SYSTEM

[76] Inventor: Dick T. Van Manen, 25 Holiday Harbour, Canandaigua, N.Y.

[22] Filed: Aug. 2, 1971

[21] Appl. No.: 168,284

Related U.S. Application Data

[63] Continuation-in-part of Ser. No. 153,262, June 15, 1971.

[52] U.S. Cl......... 425/249, 425/451, 425/DIG. 205, 425/DIG. 209
[51] Int. Cl............................................. B29d 23/03
[58] Field of Search.................... 425/242, 245, 247, 425/249, 250, 251, 326 B, 130, 387 B, 134, 451, 450, DIG. 203, DIG. 205, DIG. 209, DIG. 211; 264/97, 328

[56] References Cited
UNITED STATES PATENTS

| | | | |
|---|---|---|---|
| 2,226,408 | 12/1940 | Nast | 425/130 |
| 2,488,786 | 11/1949 | Watkins | 425/245 |
| 3,012,280 | 12/1961 | Scott et al | 425/245 |
| 3,121,919 | 2/1964 | Turner | 425/249 X |
| 3,482,284 | 12/1969 | Rees | 425/130 |

FOREIGN PATENTS OR APPLICATIONS

| | | | |
|---|---|---|---|
| 1,169,524 | 12/1958 | France | 425/242 |
| 4,522,029 | 7/1970 | Japan | 425/130 |

Primary Examiner—J. Spencer Overholser
Assistant Examiner—Michael O. Sutton
Attorney—John F. McClellan, Sr.

[57] ABSTRACT

An injection mold/blow mold system having a rotative cavity-system and a reciprocating core system; the cavity-system includes a rotary manifold fed through an axial sprue in one face of the manifold, the sprue connects through sub-sprues with injection molding cavities paraxially positioned in the opposite face of the manifold. Injection blow molding cavities are positioned between the injection molding cavities, all cavities being equidistant from the axis of the manifold; the core-system reciprocates parallel with the axis of rotation of the manifold to and from the cavity bearing face.

10 Claims, 2 Drawing Figures

Patented Aug. 14, 1973
3,752,625
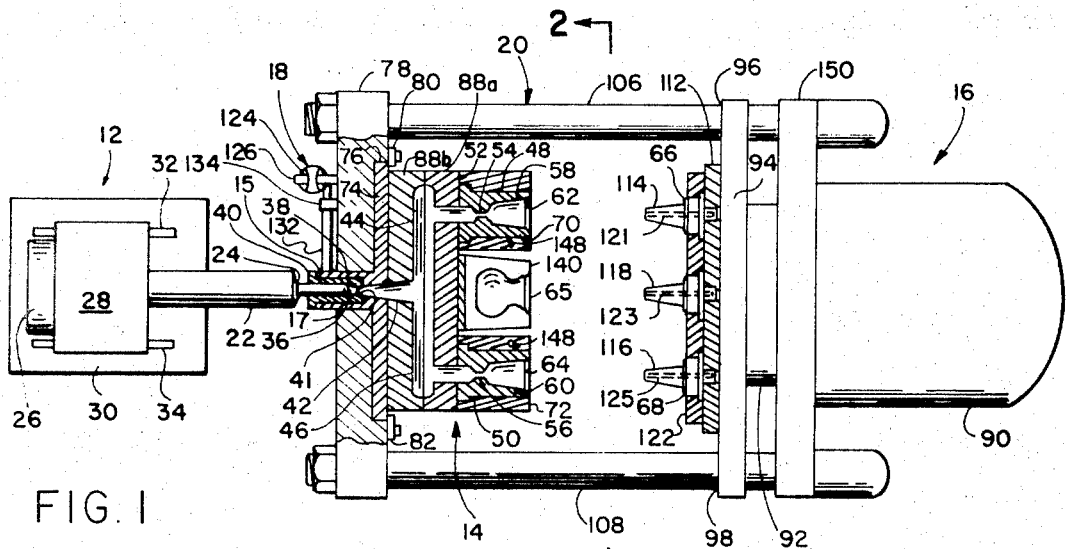
FIG. 1
FIG. 2
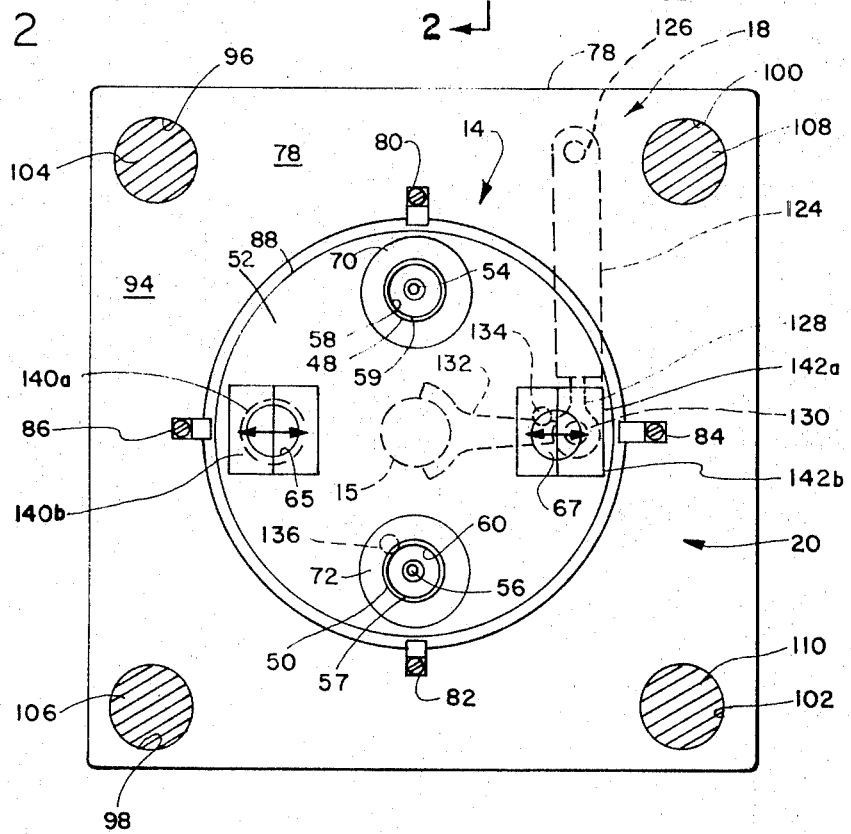
INVENTOR
DICK T. VAN MANEN
BY
John F. McClellan Sr.
ATTORNEY

ROTARY PARAXIAL-CAVITY RECIPROCABLE-CORE INJECTION MOLD/INJECTION BLOW MOLD SYSTEM

This application is a continuation in part of my co-pending application for United States Patent, Ser. No. 153,262, filed June 15, 1971, for INJECTION MOLD-/INJECTION BLOW MOLD SYSTEM.

This invention relates generally to plastic molding systems and specifically to injection molding/injection blow molding systems.

My above-referenced co-pending patent application discloses an axially fed cavity-bearing rotary manifold which co-acts with cores which reciprocate to and from the cavities at an angle to the axis of rotation (typically the cores reciprocate radially to the rotary manifold).

The present system, in contrast, comprises an axially fed cavity-bearing rotary manifold which co-acts with cores which reciprocate to and from through cavities parallel with the axis of rotation.

The objects of the invention set forth in my co-pending application also apply to the present invention. In general design, both systems are simple, economical, rugged, compact and accessible for inspection, changeover, adjustment and repair.

Both systems are adapted for separate or for simultaneous injection molding and injection blow molding, and for production of parts having external undercut configuration, without the undue cycle prolongation encountered in use of conventional cam-action molds; and both systems can be adapted, although in different ways, for injection molding/injection blow molding using inserts, without cycle interruption for loading and/or unloading. In both systems, only axial, symmetrical forces are imposed on hot parisons as they are removed from the molds.

As to structure, the systems of my co-pending application and of my present application can use some of the same components which will be described below, such as the injector unit, including the nozzle for feeding plastic material into the manifold, and such as parts or all of the clamp, the tie-bar assembly, and the manifold-rotation actuator assemblies. Additionally, the cores and the cavities, both injection molding and injection blow molding, are of similar design.

These similarities are pointed out to indicate the flexibility of interchange between the two systems. As will be seen, both systems can be built in such manner as to use sub-components of certain types of conventional injection molding equipment if necessary. Particularly, it will become more apparent that conventional injection molding systems can be modified in the light of the present invention to adapt them for injection blow molding also.

The principal difference between my prior disclosed system and the present system has been mentioned. There is considerable similarity in that each employs an axially-fed rotary manifold having molding cavities in it. However, in the first invention the cavities open outward from the rotation axis, typically along radii, and co-act with one or more core assemblies which correspondingly reciprocate radially to and from the manifold, whereas typically in the present invention the cavities are circumferentially spaced on equal radii in an axial face of the manifold with the openings parallel with the rotative axis, and a single core assembly co-actingly reciprocates to and from the manifold parallel with the manifold axis.

Each system has its unique advantages; the advantages and other objects of the present invention will become more apparent on examination of the following description, including the drawings in which:

FIG. 1 is a plan view partly in section of an injection molding/injection blow molding system;

FIG. 2 is an elevation of the face of a manifold viewed along 2—2, FIG. 1.

In the drawings, similar parts are designated by similar numerals; the drawings will now be referred to in detail.

In FIG. 1, and referring in part to FIG. 2 for what is shown there, the injection molding/injection blow molding apparatus 10 of this invention comprises five principal units which are mentioned preliminarily for exposition as follows:

The injection unit 12 is a screw-feed or other standard plastic-injector having a modified nozzle which is axially shiftable by means to be described;

The manifold unit 14 receives plastic material from the injection unit 12 and distributes the material to injection molding cavities disposed in the axial face of the manifold opposite the injection unit;

The clamp unit 16 reciprocates a core-carrying platen which is integral with it to and from the manifold parallel with the axis of the manifold, selectively engaging the cores with the cavities of the manifold in molding operations;

The manifold rotator unit 18 angularly positions the manifold so that the cavities selectively align for co-action with the reciprocable cores;

The tie bar unit 20 includes also the mounting plate in which the manifold is rotated by the manifold rotator.

In more detail, the injection unit 12 includes a barrel 22 terminating in a nozzle 24, a motor 26 driving a pump-reservoir unit 28, and a base 30 to which the other parts are mounted by ways 32, 34 lying parallel with the barrel. The ways permit the nozzle to be slightly advanced or drawn back in its overlapping engagement inside the manifold, by a conventional control system, not shown. This provision reduces the residual pressure after a charge of plastic is forced into the manifold axial sprue by the action of the conventional screw-feeding, valve-controlled injector mechanism (not shown) within the pump reservoir unit 28.

During injection, the rounded nozzle-end 36 is advanced and pressure seals against the slightly flatter radius of the female portion 38 of the manifold sprue block 40, which is screwed to the manifold axle 15 and which slidably couples with nozzle 24.

Injected material passes axially into the manifold through sprue-block opening 41 into the main sprue 42 and then distributes radially outward thorugh sub-sprues 44, 46 into injection molds 48, 50 which are positioned on a diameter of the manifold at equal radial distances from the axially located main sprue.

The injection molds each include a mold nozzle 54, 56, an injection molding cavity 58, 60 and may have various conventional features useful in carrying out the injection molding operation, as, for example, tapered countersink 62, 64 for engagement with tapered collars 66, 68 on the cores.

Injection blow molds 140, 142 (FIG. 2) are split for ejection of blow molded parts, the split halves bieng designated as a and b in FIG. 2. The injection blow molds are located diametrically opposite each other on the same circumference as the injection molds 48, 50. They are spaced in angle halfway between the injection molds, as best shown in FIG. 2.

Each injection blow mold is of the conventional split type so that undercut parts such as bottles can easily be ejected. The halves of each injection blow mold are operable on ways (not shown) by an air system or other appropriate conventional drive (not shown) to open and close, as dictated by the conventional synchronizing control network provided for the entire system but not described herein.

Mold clamps 70, 72 screwed to the mold face 52 of the manifold secure the injection molds 48, 50 to the mold face. The mold clamps also constitute accessible and appropriately located structure in which channels for thermally conductive fluid may be provided if desired, as indicated at 148.

For ease in fabrication, inspection, cleaning, and replacement, the manifold assembly may be further divided. FIG. 1 shows a preferred, very rigid and sturdy arrangement in which the manifold axle 15 is integral with a circular oversize flange 74. Flange 74 closely fits in and revolves in a recess 76 which is disposed in the face of bearing block 78 co-axially with the axle bore 17. Flange 74 is retained by thrust clamps 80, 82, 84, 86, (84, 86 shown in FIG. 2 only) which are screwed to the bearing block 78.

The mold block 88, of which mold face 52 is a part, is preferably divided into two parts 88a and 88b, along the midline plane of the radially disposed sub-sprues 44, 46 and the entire assembly detachably unified by screwing and pinning.

The clamp unit 16 typically includes a hydraulic cylinder 90 (the drive can be pneumatic or electric if desired), a piston 92 driven by the cylinder, a clamp way-block 94 affixed to the piston and adapted by holes 96, 98, 100, 102 (100, 102 shown in FIG. 2 only), a core-mounting platen 112 affixed to the clamp way-block, and cores 114, 116, 118, 120 (120 not shown but disposed behind 118) secured to the platen by a core clamp 122.

Each of the cores has a hollow bore 121, 123, 125 shown, connected with a compressed air system (not shown) through the platen.

The cores are spaced equally on a circumference identical to the mold spacing, so that the four cores engage the four molds simultaneously, the pairing-off being in accordance with the rotative position of the manifold as determined by the manifold rotator 18.

The manifold rotator 18 is made to operate in synchronism with the other system operations according to well known principles. It comprises, in the oscillatory version shown, a hydraulic drive cylinder 124 pivoted at one end by a pin 126 to the bearing block 78. A piston 128 having a clevis end 130 pivotally engages a crank arm 132 which is secured by screws or other suitable means to the circumference of the manifold axle 15.

Stops 134 and 136 (136 shown in FIG. 2 only), are integrally affixed to the bearing block 78 in such manner and at such locations that the protruding portion of the stops-precisely limits the travel of bellcrank arm 132 to 90° sweep. This insures that the cores 114, 116 engage the injection molding cavities 58, 60 at one extreme of rotation of the manifold unit, and engage the injection blow molding cavities 65, 67 (67 shown in FIG. 2 only) at the other extreme, and that the other two cores 118, 120 (120 not shown) simultaneously engage the remaining molds at each position.

In operation, the cores which enter the injection molding cavities each receive a parison under the urging of the plastic material by the injector unit. The injector-unit valve (not shown) then cuts off flow and retraction of the unit reduces injection pressure in the manifold to zero as previously noted. Following this, the cores, carrying the hot parisons, are reciprocated out of the cavities by action of the clamp.

The manifold assembly then rotates to the other extreme of travel, aligning the injection blow mold cavities, which are at this time closed, with the parison-charged cores. The charged cores then reciprocate through the other half cycle of reciprocation carrying the parisons into the injection blow molds and sealing against the injection blow mold necks.

Compressed air is then released through the bores of the parison carrying cores. While this blow molding operation takes place, the other two cores are being charged with parisons in the injection blow molds.

During the outward reciprocation of the cores, the split blow-molds open and the finished parts fall into a suitable receiver below the system, in the preferred mode of operation. An alternative mode of operation is to open split cavities first and allow the blown parts to retract with the cores, from which they are then ejected.

According to well-known principles, compressed air passages, not shown, may be provided in the manifold if necessary to eject the product from the open blow-molds.

Because of the rigidity of support afforded the bearing block by the tie bars, which screw into it as well as into the flanged portion 150 of the cylinder 90, rotation of the manifold can be very rapid without unduly twisting the frame. The injector pressure to some degree balances the mold injection pressure, and because of the symmetry of the arrangement, rapid opening and closing of the split molds, and rapid accelerations of the clamp driven assembly, do not affect alignment of the cores with the molds.

In summary, it can be seen that this is a very simple system, and that a majority of the process carried out with it is identical to injection molding.

Only two cores and two cavities can be used, if desired, although the two pairs described are preferred, for economy in required manifold rotative angle. The system is adapted for large-scale embodiment also, with sets of four, eight or more molds being used in accordance with the principles of this invention. With reference to the use of larger numbers of molds it should be noted that the injection feed-paths to each mold can be exactly equal if desired, and that inertial forces due to rotation of the manifold can be kept exactly equal as to each radial sub-sprue.

It is obvious that clamp stroke length required with this invention is an absolute minimum.

Obviously, many modifications and variations of the present invention are possible in light of the above teachings. It is, therefore, to be understood that within the scope of the appended claims the invention may be practiced otherwise than as specifically described.

What is claimed and desired to be obtained by United States Letters Patent is:

1. Injection blow molding apparatus comprising: rotary manifold means having: means with a central input opening therein, means defining a paraxial injection molding cavity radially spaced from and connected with the central input opening, and means defining a blow molding cavity isolated from said central input opening, said blow molding cavity being circumferentially spaced from the injection molding cavity and parallel therewith; core means, means for reciprocating the core means parallel with the manifold means axis for selective engagement with one of said molding cavities, means for rotating the manifold means to select said core means engagement, and means for feeding material to be molded into the manifold means central input opening.

2. Injection blow molding apparatus as recited in claim 1, wherein said means with a central input opening therein is an axial portion of the rotary manifold means and wherein the central input opening is axial to the rotary manifold means.

3. Injection blow molding apparatus as recited in claim 2, wherein all said defining means define plural said paraxial injection molding cavities with plural said blow molding cavities circumferentially spaced therefrom, and wherein plural core means are provided and spaced for engagement with plural said injection molding cavities and plural said blow molding cavities selectively according to the rotative position of the rotary manifold means.

4. Injection blow molding apparatus as recited in claim 2, wherein the means for rotating the manifold means comprises: means having an aperture therethrough for rotatively mounting said axial portion, operative means having a portion fixed relative to the apertured means and a movable portion engaging the manifold means for rotating the manifold means, and stop means fixed relative to the recessed means for defining a rotative position of the manifold means.

5. Injection-blow molding apparatus as recited in claim 4, and second stop means for defining a second rotative position of the manifold means.

6. Injection blow molding apparatus as recited in claim 4, wherein the means for reciprocating the core means includes clamp means attached to the core means and means attached to said apertured means for guiding said reciprocation of the core means.

7. Injection blow molding apparatus as recited in claim 2, wherein the means for feeding material into the manifold means includes nozzle means, and wherein means are provided for producing axial movement of the nozzle means within the axial opening in the manifold means, thereby altering the feed of said material within the manifold means.

8. Injection blow molding apparatus as recited in claim 4, wherein the means for rotating the manifold means comprises additionally a circular portion of the manifold means coaxial with said portion with the axial opening therein, and wherein the means having an aperture therethrough has additionally a coaxial recess in a face thereof adapted for rotative mounting of said circular portion of the manifold means.

9. Injection blow molding apparatus as recited in claim 3, wherein the respective injection molding cavities are positioned in alternation circumferentially with the respective injection blow molding cavities.

10. Injection blow molding apparatus as recited in claim 9, wherein the circumferential spacing from each respective cavity to the next adjacent said cavity is substantially equal.

* * * * *